(12) United States Patent
Hegedusch et al.

(10) Patent No.: US 10,479,167 B2
(45) Date of Patent: Nov. 19, 2019

(54) DEVICE FOR REGULATING COOLING AIR ON A MOTOR VEHICLE

(71) Applicant: Dr. Ing. h.c. F. Porsche Aktiengesellschaft, Stuttgart (DE)

(72) Inventors: Tobias Hegedusch, Schwieberdingen (DE); James Horn, Sindelfingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 456 days.

(21) Appl. No.: 14/844,070

(22) Filed: Sep. 3, 2015

(65) Prior Publication Data

US 2016/0068040 A1 Mar. 10, 2016

(30) Foreign Application Priority Data

Sep. 10, 2014 (DE) .................. 10 2014 113 067

(51) Int. Cl.

| | |
|---|---|
| *B60H 1/00* | (2006.01) |
| *B60H 1/24* | (2006.01) |
| *B60H 1/26* | (2006.01) |
| *B60R 19/12* | (2006.01) |
| *B60R 19/48* | (2006.01) |
| *B60K 11/08* | (2006.01) |

(52) U.S. Cl.
CPC ......... *B60H 1/00692* (2013.01); *B60H 1/242* (2013.01); *B60H 1/26* (2013.01); *B60K 11/085* (2013.01); *B60R 19/12* (2013.01); *B60R 19/48* (2013.01); *B60H 2001/007* (2013.01); *B60R 2019/486* (2013.01); *Y02T 10/88* (2013.01)

(58) Field of Classification Search
CPC ...... B60H 1/00692; B60H 1/242; B60H 1/26; B60H 2001/007; B60K 11/085; B60R 19/12; B60R 19/48; B60R 2019/486; Y02T 10/88

USPC .......................................................... 454/143
See application file for complete search history.

(56) References Cited

U.S. PATENT DOCUMENTS

| | | | |
|---|---|---|---|
| 1,705,710 A | 3/1929 | Bindon | |
| 2,094,932 A * | 10/1937 | Hargreaves | .............. B60J 1/205 160/264 |
| 8,091,822 B2 * | 1/2012 | Boyce | ..................... G09F 19/18 244/13 |
| 8,627,911 B2 | 1/2014 | Tregnago et al. | |

(Continued)

FOREIGN PATENT DOCUMENTS

| | | | |
|---|---|---|---|
| DE | 3522591 | 1/1987 | |
| DE | 3701584 A1 * | 8/1988 | ............. B60K 11/04 |

(Continued)

OTHER PUBLICATIONS

French Search Report dated Aug. 27, 2018.

*Primary Examiner* — Gregory L Huson
*Assistant Examiner* — Dana K Tighe
(74) *Attorney, Agent, or Firm* — Gerald E. Hespos; Michael J. Porco; Matthew T. Hespos

(57) ABSTRACT

A device (10) for regulating cooling air on a motor vehicle has a roller blind (12) that can be moved across an air inlet opening of the motor vehicle. The device (10) has a horizontally aligned sealing frame (18) for guiding the roller blind (12) across the air inlet opening. The device (10) comprises a supporting frame arranged within the sealing frame (18) for supporting the roller blind (12) against the cooling air.

9 Claims, 3 Drawing Sheets

(56) References Cited

U.S. PATENT DOCUMENTS

| | | |
|---|---|---|
| 2006/0211364 A1 | 9/2006 | Brotz et al. |
| 2011/0232865 A1 | 9/2011 | Mildner |
| 2014/0216835 A1 | 8/2014 | Bartl |
| 2015/0183313 A1 | 7/2015 | Bueckner |

FOREIGN PATENT DOCUMENTS

| | | |
|---|---|---|
| DE | 19527442 | 1/1997 |
| DE | 102006001797 | 7/2007 |
| DE | 102006042627 | 3/2008 |
| DE | 2011009778 A1 | 8/2012 |
| FR | 2738779 | 3/1997 |

\* cited by examiner

DEVICE FOR REGULATING COOLING AIR ON A MOTOR VEHICLE

CROSS REFERENCE TO RELATED APPLICATION

This application claims priority under 35 USC 119 to German Patent Appl. No. 10 2014 113 067.7 filed on Sep. 10, 2014, the entire disclosure of which is incorporated herein by reference.

BACKGROUND

1. Field of the Invention

The invention relates to a device for regulating cooling air on a motor vehicle. The invention also relates to a front end module for a motor vehicle, a front part for a motor vehicle and a method for producing a motor vehicle.

2. Description of the Related Art

A wide variety of covering elements are used to regulate cooling air in motor vehicles. Some are textiles and may be wound onto a shaft in the manner of a roller blind and function like a sun shade.

FR 2 738 779 discloses a roller blind that is moved transversely across an air inlet. This roller blind is arranged vertically and is formed from interconnected segments.

US 2014/0216835 A1 describes a roller blind that opens or closes openings in the rear wall or in the floor of a driver's cab to produce cooling.

DE 10 2006 042 627 A1 discloses an air regulating device that is formed by a textile web that is tensioned by a spring force.

DE 10 2006 001 797 A1 describes a covering element capable of being selectively opened for regulating the air inlet. Segments of the element may be folded up individually in the form of a letter "V".

SUMMARY

The invention relates to a device for regulating cooling air on a motor vehicle, and includes a roller blind with guide that is designed as a sealing frame. The invention was made with the insight that the flexible roller blind may be exposed to a considerable headwind during operation of the motor vehicle. This headwind increases in severity with increasing driving speed. This headwind promotes the desired supply of cooling air through the air inlet opening by pushing the opened roller blind back completely from the air inlet opening of the motor vehicle. The closed roller blind, on the other hand, is slid across the air inlet opening, and can created a flow resistance that can lead to excessive stress on the shutter.

A roller blind according to the invention counteracts this effect primarily by an additional supporting frame arranged within the sealing frame. The supporting frame supports the roller blind against the cooling air flowing against the vehicle and thus imparts a particular rigidity to offset a high degree of bending stress.

The roller also can have vertically aligned supporting ribs arranged relative to the supporting frame so that the supporting frame supports the supporting ribs while the roller blind is slid across the air inlet opening. This quasi-"interlinking" of the supporting ribs and frame additionally reduces the risk of the roller blind bending.

The roller blind may comprise a reinforced textile into which the supporting ribs are directly sewn. An embodiment of this kind combines the elastic properties of an industrial textile with the bending strength of the integrated supporting ribs and thus is particularly beneficial to the rigidity of the overall device.

The device may comprise an upper shutter and a lower shutter, each of which has a dedicated sealing frame. This two-part embodiment improves cooling air regulation—the primary aim—without loss of rigidity, and also supports the legform impactor for protection of pedestrians.

The device may include a roller blind receptacle for receiving the roller blind with an integrated unrolling unit for unrolling the roller blind across the air inlet opening. An actuator may be integrated into this unrolling unit, and can simultaneously operate both roller blinds of a correspondingly fitted device by means of a cable control.

The modular construction allows the device to be integrated in a simple manner into the front end module on a production vehicle, where the device interacts in an advantageous way with the complementary air inlet openings of the front part thereof. In this context, the improved support perpendicular to the yawing axis of the vehicle can be achieved if the device is secured not only in the front end module but also on the front part after the installation of the front end that may take place on an assembly line.

An illustrative embodiment of the invention is shown in the drawings and is described in detail below.

DETAILED DESCRIPTION

Figure 1:
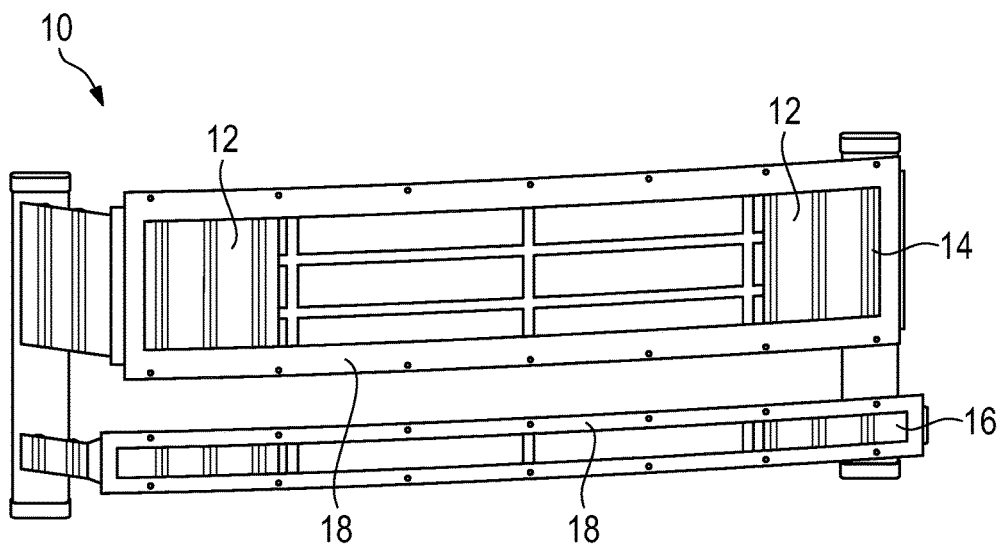
FIG. 1 is a perspective view of a device according to a first embodiment of the invention.

FIG. 1 illustrates the structural features a first embodiment of a device 10 according to of the invention for regulating cooling air on a motor vehicle. The device 10 comprises four roller blinds 12 made from a reinforced textile. The roller blinds 12 form an upper shutter 14 and a lower shutter 16 in pairs and can be moved across the air inlet opening of the motor vehicle, which is not shown in its entirety for reasons of simplification. In this arrangement, the upper shutter 14 and the lower shutter 16 each have a horizontally aligned sealing frame 18 for guiding the roller blind 12 across the air inlet opening so that the path of movement of the roller blinds 12 also is aligned horizontally.

Figure 2:
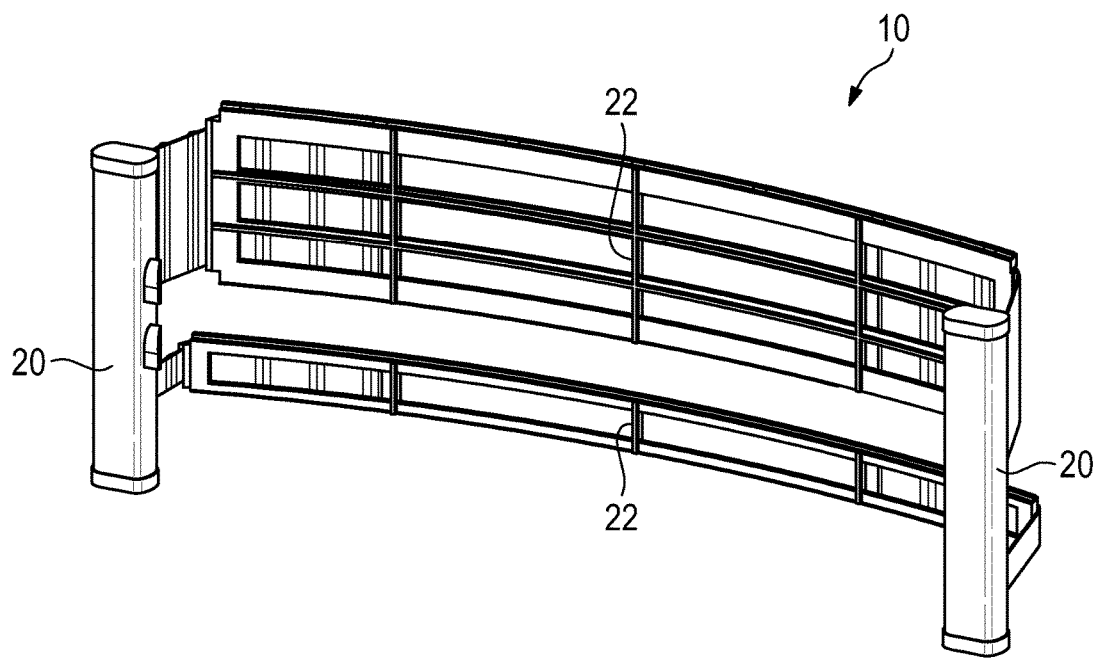
FIG. 2 is a view of the device from a different perspective.

FIG. 2 shows the device 10 from a different perspective and shows two further features. First, supporting frames 22 arranged within the sealing frames 18 support the roller blinds 12 on both sides against the inflowing cooling air. Second, the device 10 comprises a two-part roller blind receptacle 20 for receiving the roller blinds 12 while they are not slid completely across the air inlet opening but are rolled up at least partially. The roller blind receptacle 20 comprises an unrolling unit (not shown) with an integrated actuator for unrolling the roller blinds 12 across the air inlet opening.

Figure 3:
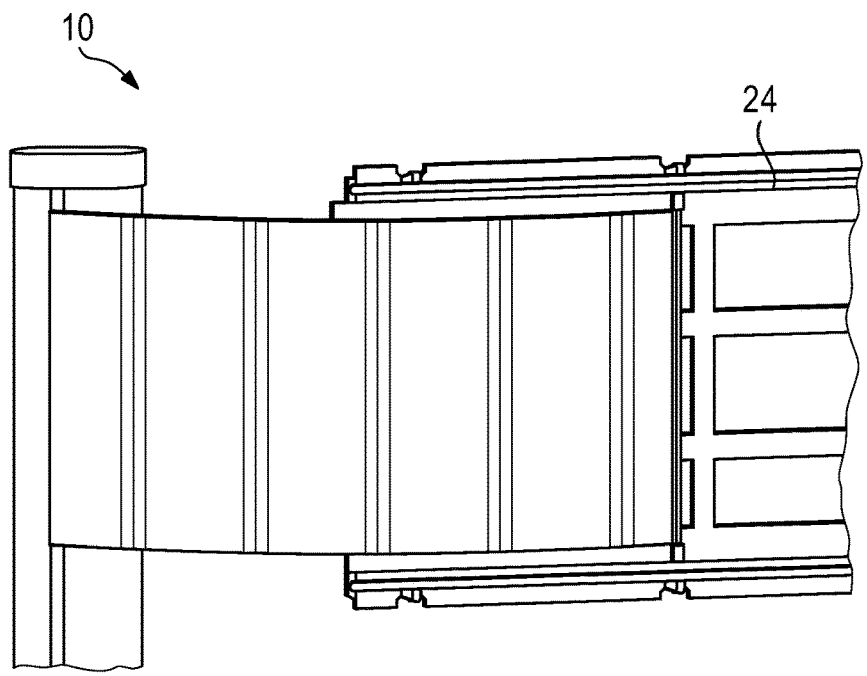
FIG. 3 is the perspective view of a first detail of the device.

The operation of the actuator becomes clear in FIG. 3. Thus, the sealing frames 18, shown using the upper sealing frame 18 as an example, comprise cable controls 24 for opening the roller blinds 12. The controls are connected mechanically to the roller blinds 12 and to the actuator. Each cable control 24 is connected to two roller blinds 12 so that the actuator can open both roller blinds 12 simultaneously.

Figure 4:
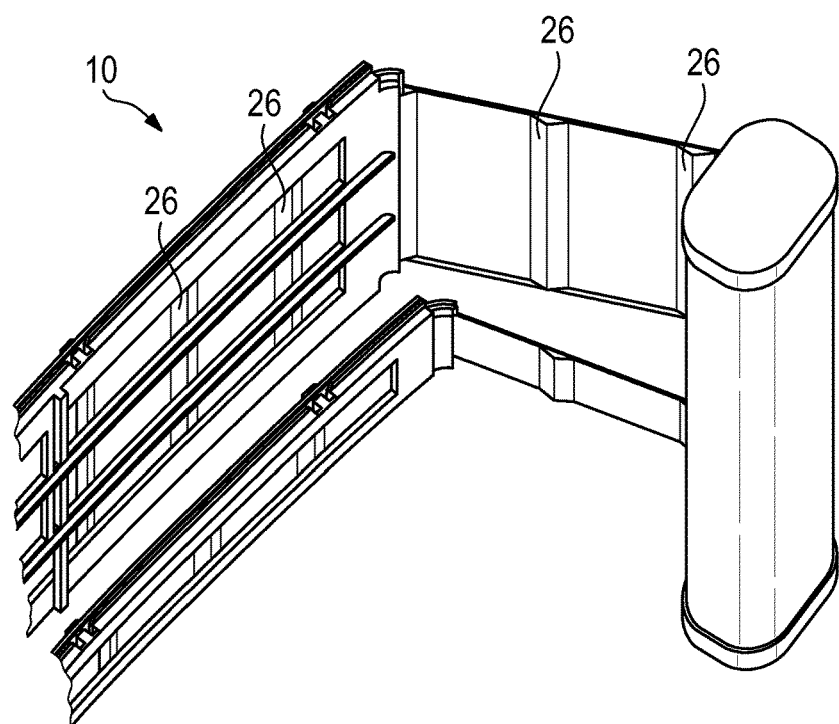
FIG. 4 is a perspective view of a second detail of the device.

As shown in FIG. 4, the roller blinds 12 comprise vertically aligned supporting ribs 26. The supporting frame 22 and the supporting ribs 26 are arranged relative to one another so that the supporting frame 22 supports the supporting ribs 26 when the roller blind 12 is not completely rolled up in the roller receptacle 20, as shown in FIG. 4, but has been slid at least partially across the air inlet opening.

Figure 5:
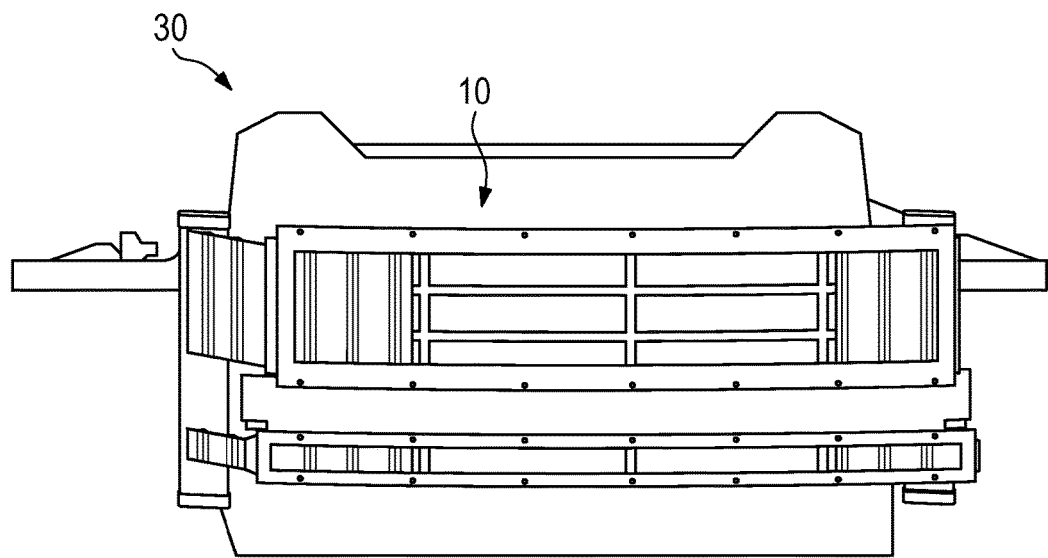
FIG. 5 is a perspective view of a front end module according to a second embodiment of the invention.
Figure 6:
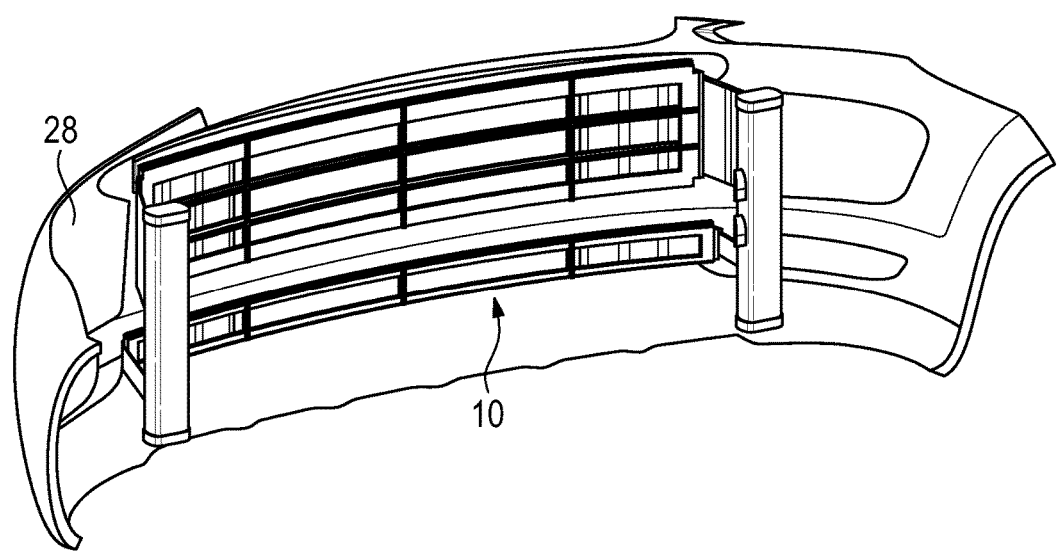
FIG. 6 is a perspective view of a front part according to a third embodiment of the invention.

FIG. 5 shows a front end module 30 used in the context of the production of a motor vehicle, with the device 10 of FIGS. 1 to 4 secured therein. Finally, FIG. 6 shows a front part 28 of a complementary nature for the same motor vehicle, the air inlet openings of which are designed to accommodate the device 10. After the fitting of the front part 28 to the motor vehicle on an assembly line, the device 10 also is secured in the front part 28 as shown in FIG. 6.

What is claimed is:

1. A device for regulating cooling air on a motor vehicle, comprising:
   an upper shutter and a lower shutter, the upper and lower shutters being formed respectively with upper and lower sealing frames mounted in an air inlet opening of the motor vehicle, each of the sealing frames having first and second side portions spaced from each other in a first direction and top and bottom portions extending between first and second side portions and spaced from each other in a second direction normal to the first direction, and upper and lower openings formed between the first and second side portions and the top and bottom portions of the respective upper and lower shutters, the upper and lower openings being in communication with the air inlet opening;
   each of the upper and lower shutters having first and second reinforced textile roller blinds mounted in proximity to the first and second side portions of the respective upper and lower sealing frames respectively and movable between a closed position in which the first and second roller blinds meet between the first and second side portions of the respective upper or lower sealing frame to extend across and close the air inlet opening, and an open position in which the first and second roller blinds are retracted from the opening in the respective sealing frame to positions roller blinds and extending in the second direction between upper and lower edges of the first and second roller blinds; and
   upper and lower supporting frames attached respectively to the upper and lower sealing frames and having at least one component aligned in the first direction to intersect the supporting ribs and supporting the respective roller blind against the cooling air.

2. The device of claim 1, wherein the device further comprises first and second roller blind receptacles for receiving the respective first and second roller blinds when the first and second roller blinds are in the open position, the first and second roller blind receptacles having an unrolling unit for unrolling the roller blinds across the air inlet opening.

3. The device of claim 2, wherein the unrolling unit comprises an actuator, and the sealing frame comprises a cable control for opening the first and second roller blinds, the cable control being connected mechanically to the roller blinds and to the actuator.

4. The device of claim 3, wherein the cable control is connected to first and second roller blinds in such a way that the actuator can open the first and second roller blinds simultaneously.

5. A front end module for a motor vehicle, comprising the device of claim 1 secured in the front end module.

6. A front part for a motor vehicle, comprising an air inlet opening designed to accommodate the device of claim 1.

7. A method for producing a motor vehicle, characterized by the following features:
   securing the device of claim 1 in a front end module of the motor vehicle,
   fitting a front part with an air inlet opening to the motor vehicle on an assembly line, and
   securing the device in the fitted front part.

8. The device of claim 1, wherein the upper and lower supporting frames and the upper and lower sealing frames are disposed and configured to support opposite front and rear surfaces of first and second roller blinds when the first and second roller blinds are moved toward the closed position.

9. The device of claim 1, wherein the upper and lower supporting frames further comprise components extending in the second direction and having opposite ends connected respectively to the top and bottom portions of the respective sealing frame.

* * * * *